United States Patent [19]

Fischer et al.

[11] Patent Number: 4,469,509

[45] Date of Patent: Sep. 4, 1984

[54] PROCESS OF PRODUCING SPONGE IRON BY A DIRECT REDUCTION OF IRON OXIDE-CONTAINING MATERIAL IN A ROTARY KILN

[75] Inventors: Karl-Heinz Fischer, Neu-Isenburg; Wolfram Schnabel, Idstein; Harry Serbent, Hanau, all of Fed. Rep. of Germany

[73] Assignee: Metallgesellschaft Aktiengesellschaft, Frankfurt am Main, Fed. Rep. of Germany

[21] Appl. No.: 417,960

[22] Filed: Sep. 14, 1982

[30] Foreign Application Priority Data

Mar. 11, 1982 [DE] Fed. Rep. of Germany ....... 3208701

[51] Int. Cl.$^3$ .............................................. C21B 13/08
[52] U.S. Cl. ........................................ 75/36; 266/173
[58] Field of Search ...................... 75/33, 36; 266/220, 266/213, 173

[56] References Cited

U.S. PATENT DOCUMENTS 3,881,916  5/1975  Serbent et al. ........................ 75/36
3,890,138  6/1975  Hockin ................................... 75/33

FOREIGN PATENT DOCUMENTS 991465  10/1951  France ................................... 75/36

*Primary Examiner*—M. J. Andrews
*Attorney, Agent, or Firm*—Sprung, Horn, Kramer & Woods

[57] ABSTRACT

In the operation of the rotary kiln provided at its charging end with a central burner, solid reducing agents having a high content of volatile constituents are used and the charge and the gas atmosphere are conducted in cocurrent streams. To avoid a high heat load per unit of volume in the heating-up zone and yet to increase the heating-up rate, a solid carbonaceous reducing agent having a high content of volatile constituents is charged together with the iron oxide-containing material into the charging end of the rotary kiln, oxygen-containing gases are blown through nozzle blocks into the free gas space and into the charge in the heating-up zone, and oxygen-containing gases are blown through nozzle blocks into the free kiln space in the reducing zone.

10 Claims, 1 Drawing Figure

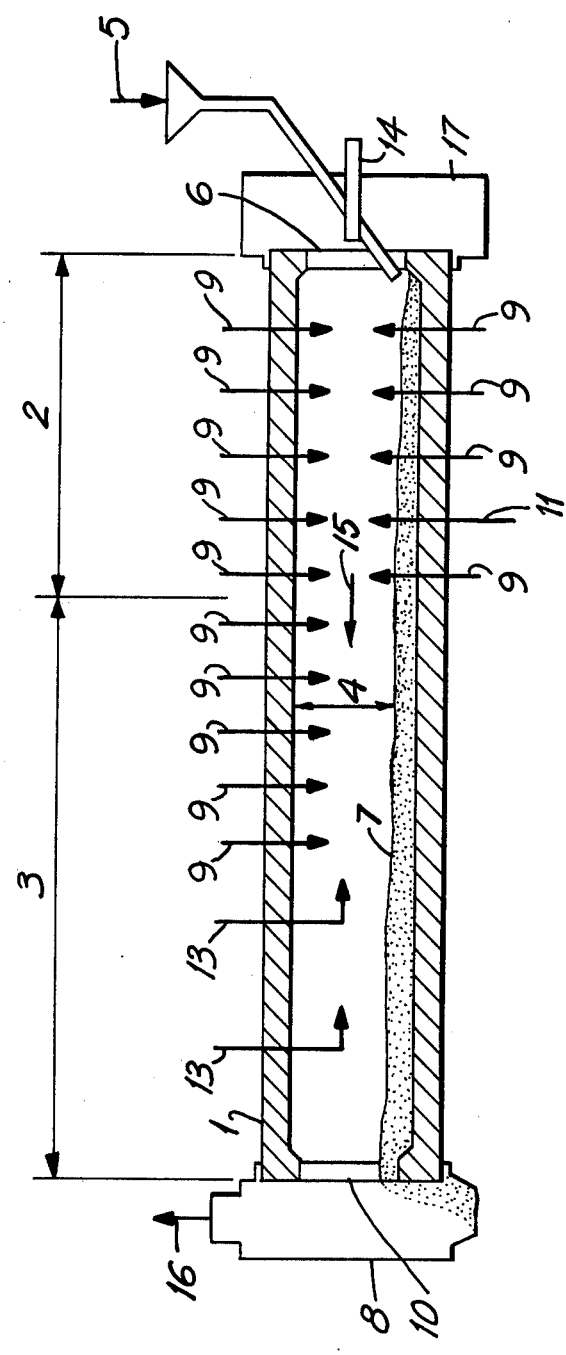

PROCESS OF PRODUCING SPONGE IRON BY A DIRECT REDUCTION OF IRON OXIDE-CONTAINING MATERIAL IN A ROTARY KILN

BACKGROUND OF THE INVENTION

1. Field of the Invention

This invention relates to a process of producing sponge iron by a direct reduction of iron oxide-containing materials in a rotary kiln below the softening and melting points of the charge, wherein solid carbonaceous reducing agents having a high content of volatile constituents are used, oxygen-containing gases are blown through the shell of the rotary kiln at points distributed over the length thereof, the charge and the gas atmosphere are passed through the kiln in concurrent streams and hot gases are fed into the charging end of the rotary kiln by a central burner.

2. Discussion of Prior Art

The cocurrent operation of a rotary kiln used for a direct reduction affords certain advantages over a counter-current operation. If only a partial reduction to a metallization of 30 to 65% is desired, this can be effected under stable operating conditions. Additionally, a reducing coal having a smaller particle size may be used without risk that substantial quantities of unburnt carbon may be entrained out of the kiln by the exhaust gases.

A central burner at the charging end of the rotary kiln is required for the heating of the charge. As the heating rate depends on the temperature of the hot gases from the burner, said gases are supplied to the rotary kiln at the highest possible temperature although this results in a heavy wear of the lining of the rotary kiln and in a burning of carbon of the solid reducing agent charged into the charging end.

If the reducing agent charged into the charging end of the rotary kiln consists of coals having a high content of volatile constituents, the latter is expelled very quickly and is not effective for release of energy in the heating-up zone. As heat is consumed for the devolatilization, these volatile constituents increase the heat requirement in the heat-up zone so that the heat load per unit of volume in the heating-up zone increase also. These volatile constituents also result in uncontrolled combustion.

For this reason coals having a high content of volatile constituents are not charges directly into the charging end of the rotary kiln but are entrained in air which is blown from the charging end so that at least part of such coals are carried beyond the heating-up zone directly into the reducing zone (German Pat. Nos. 15 83 954 and 19 27 558). That practice, however, involves uncontrolled combustion, which results in incrustation and in damage to the shell pipes in the reducing zone.

SUMMARY OF THE INVENTION

It is another object of the invention to avoid in cocurrent operation a high heat load per unit of volume in the heating-up zone and nevertheless to heat up the charge at a higher rate.

This object is accomplished according to the invention in that a solid carbonaceous reducing agent having a high content of volatile constituents is charged into the charging end of the rotary kiln together with the iron oxide-containing material, oxygen-containing gases are blown through nozzle blocks into the free gas space and into the charge in the heating-up zone, and oxygen-containing gases are blown through nozzle blocks into the free kiln space in the reducing zone.

The carbonaceous solids contain at least 15% volatile constituents. Brown coals e.g. lignites are preferably used. The term "nozzle blocks" is used to describe gas-feeding means which extend through the wall and the refractory lining of the tubular kiln and have outlet openings which are flush with the inside surface of the refractory lining or protrude or are recessed from said surface by a small distance. The nozzle blocks may consist of ceramic or metallic materials. The nozzle blocks extend radially and are arranged in annular series, in which the nozzle blocks are peripherally spaced apart by a distance which generally amounts to at least 2.5 to 3.5 meters. The annular series of nozzle blocks are spaced at least 2.5 to 3.5 meters apart along the rotary kiln. Said spacings are generally adequate for permitting a blowing of oxygen at a sufficiently high rate and an effective distribution and mixing.

The nozzle blocks of each annular series may be connected to a commom annular duct for supplying the gases. In the heating-up zone all nozzle blocks of an annular series are continuously supplied with oxygen-containing gas, which generally consists of air. In case of an excessively large pressure drop in the nozzle blocks disposed under the charge, the nozzle blocks blowing into the free kiln space may be throttled.

In the reducing zone, the supply of air to a given nozzle block is interrupted as long as said nozzle block is disposed under the charge and covered by the latter. The nozzle blocks of the first annular series are disposed shortly after the charging end of the rotary kiln. Owing to the high temperature of the hot gases from the central burner, individual particles of the solid reducing agent are very quickly heated to the ignition temperature of about 300° C. on the surface of the charge bed. By the tumbling motion of the charge bed, the ignited particles are drawn into the interior of the bed, where the temperature is much lower so that they would cool unless oxygen is blown into the charge. The oxygen blown into the charge ensures that the combustion of said ignited particles proceeds so that their volatile constituents are released and burnt in the charge.

As a result, other particles of the solid reducing agent in the charge are also heated to the ignition temperature so that a virtual chain reaction results and a considerable part of the heat required to heat up the charge is developed and transferred in the charge bed.

That part of the expelled volatile constituents which cannot be completely burned therein will be burned in the free kiln space by the oxygen blown into said free kiln space through the nozzle blocks. The heating-up zone extends along the rotary kiln to a point at which the charge has been heated approximately to the temperature that is desired in the reducing zone, where the reduction to metallic iron is effected. In the heating-up zone, higher oxides of iron are reduced to lower ones if the required temperature and gas composition are present.

According to a preferred further feature, a metallization above 30% is effected in the last portion of the reducing zone in that oxygen-containing gases are blown there through shell pipes into the free kiln space. The shell pipes extend radially and their outlet openings lie approximately at the center of the cross-section of the kiln and extend parallel to the longitudinal axis of the kiln. It is apparent that these outlet openings are not covered by the charge so that only one shell pipe is required for each blowing-in point. The last portion of the reducing zone extends along about 30 to 50% of the entire length of the reducing zone. In this manner a higher metallization can be effected with only 1 to 3 shell pipes.

According to a further preferred feature, 50 to 80% of all oxygen blown into the rotary kiln is blown into the heating-up zone. This results in very good operating conditions.

According to a further preferred feature, 10 to 50% of all oxygen which is blown in is blown into the charge in the heating-up zone. This results in particularly good operating conditions.

According to a further preferred feature, the central burner is operated with air in a sub-stoichiometric rate. In that case, secondary air to be admixed to the gases from the burner is fed through nozzle blocks into the free kiln space in the heating-up zone so that the flame of the central burner can be extended over a larger distance along the heating-up zone and the heat load per unit of volume is thus reduced.

The advantages afforded by the invention reside in that for a given throughput rate the heat load per unit of volume in the heating-up zone can be increased or the throughput rate can be substantially increased for a given heat load per unit of volume. Additionally, inexpensive solid reducing agents having a high content of volatile constituents can be used in a simple manner and without affecting the subsequent operation.

BRIEF DESCRIPTION OF THE DRAWING

The drawing is a schematic diagram of a rotary kiln for use in the present invention.

DESCRIPTION OF PREFERRED EMBODIMENT

Referring to the drawing rotary furnace (kiln) 1 is shown. A charge 5 consisting of iron-oxides, solid carbonaceous material and eventually sulfur-binding material is charged at the charging end 6 of the kiln 1. A bed 7 of the charge travels through the kiln 1 and is discharged from head 8 at the discharge end 10 of the kiln 1. Above the charge 7 is a full gas space 4. Shortly, after the charging end 6 of the kiln 1, there is provided a first annular series of nozzle blocks 9 (shown schematically). Further annular series of nozzle blocks 9 (shown schematically) are provided throughout the length of the kiln 1. Some are shown schematically. Air is supplied to kiln 1 by an annular supply conduit 11 (shown schematically) and fron this to the nozzle blocks 9 of each series. The air supply is shown only for one series provided shell pipes 13 (shown schematically) which are supplied with air. The kiln atmosphere in the free gas space 4 flows in the direction of arrow 15. The discharge orifices of shell tubes 13 can be disposed against or in the direction of flow of the kiln atmosphere. A central burner 14 is provided at the charging end of kiln 1 in head 17. The waste gas 16 is sucked off from head 8.

DESCRIPTION OF SPECIFIC EMBODIMENTS

In carrying out the invention, solid carbonaceous material having a high content of combustible volatiles ($H_2$, hydrocarbons, CO) are employed. The content of these volatiles is at least 15% by weight and up to about 50%.

In the process the iron oxide containing material together with the solid carbonaceous reducing agent is heated up to about the temperature of the reducing zone. The atmosphere in the heating up zone is reducing. The temperature of the charge at the end of the heating up zone is about 850° C. to 1060° C. The length of the heating up zone depends on the specific working conditions, especially on the kiln size. The length of the heating up zone is between 30% to 50% of the total kiln length.

The heated up materials are introduced into the reducing zone in which the temperature of the materials is held constant or raised slightly. The temperature in the reducing zone is between 900° C. to 1060° C. and preferably between 930° C. to 1040° C. The length of the reducing zone is, depending on the length of the heating up zone, 50% to 70% of the total kiln length. The reduction in the reducing zone is effected until a metallization of 10% to 30% is reached. If a metallization above 30% is desired, then oxygen gases are blown into the free kiln space through shell pipes in the last portion of the reducing zone. By the term "last portion of the reducing zone" is meant the portion of the reducing zone before the discharge end of the kiln and having a length of about 30% to 50% of the total length of the entire reducing zone.

EXAMPLES

The rotary kiln had a length of 60 meters and an inner diameter of 4 meters. 48 tons per hour of charge were fed into the kiln. Per ton of ore were charged 435 kg coal, 40 kg quartzite and 220 kg dolomite. The coal contained 31% by weight of combustible volatiles.

EXAMPLE 1

(Prior Art)

The rotary kiln was not equipped with nozzle blocks. The length of the heating up zone was 35 meters. The charge temperature at the end of the heating up zone was 1000° C. and at the end of the reducing zone 1050° C. The respective gas temperature was 1350° C. and 1150° C. The metallization was 10%.

EXAMPLE 2

The kiln was equipped with 12 annular series of nozzle blocks beginning 3 meters behind the charging end and ending at 36 meters from the charging end. Each annular series consisted of 4 nozzle blocks.

The length of the heating up zone was 20 meters. The charge temperature at the end of the heating up zone was 1000° C. and at the end of the reducing zone 1050° C. The respective gas temperature was 1200° C. and 1100° C. The metallization was 28%.

EXAMPLE 3

The kiln was equipped with nozzle blocks as in Example 2. Additionally two shell pipes were situated at a length of 40 and 50 meters.

The conditions were the same as those of Example 2 but with the following differences: The gas temperature at the end of the reducing zone was 1150° C. and the metallization was 35%.

We claim:

1. In a process of producing sponge iron by a direct reduction of iron oxide-containing materials in a rotary kiln below the softening and melting points of the charge, said rotary kiln having a charging end, a discharging end, a plurality of gas-feeding means distributing over the rotary kiln length, a heating-up zone, a reducing zone and a free gas space, said heating-up zone adjacent said charging end, said reducing zone adjacent said discharging end, wherein solid carbonaceous reducing agents having a high content of volatile constituents are used, oxygen-containing gases are blown into the rotary kiln through said gas-feeding means, the charge and the gas atmosphere formed in the rotary kiln are passed through the rotary kiln in cocurrent streams and hot gases are fed into the charging end of the rotary kiln by a central burner, the improvement comprising (a) charging the solid carbonaceous reducing agent having a high content of volatile constituents into the charging end of the rotary kiln together with the iron oxide-containing material, (b) blowing the oxygen-containing gases through said gas-feeding means, said gas-feeding means comprising nozzle blocks, into the free gas space in the rotary kiln and into the charge in the heating-up zone in the rotary kiln, and (c) blowing oxygen-containing gases through said gas feeding means, said gas feeding means comprising nozzle blocks, into the free gas space in the reducing zone in the rotary kiln.

2. A process according to claim 1, wherein the improvement further comprises providing one or more shell pipes in the rotary kiln in the last portion of the reducing zone before the discharge end of the rotary kiln, said shell pipes extend radially in the rotary kiln and said shell pipes having outside openings lying approximately at the center of the cross-section of the rotary kiln and extend parallel to the longitudinal axis of the rotary kiln, and wherein a metallization above 30% is effected in the last portion of the reducing zone by blowing oxygen-containing gas through said shell pipes into the free kiln space of said reducing zone.

3. A process according to claim 1 or 2 wherein the improvement further comprises blowing into the heating-up zone 50 to 80% of all oxygen blown into the rotary kiln.

4. A process according to claim 1, wherein the improvement further comprises blowing into the charge in the heating zone 10 to 50% of all oxygen which is blown.

5. A process according to claim 1, wherein the improvement further comprises operating the central burner with air at a sub-stoichiometric rate.

6. A process according to claim 1, wherein the improvement further comprises maintaining the temperature of the charge at the end of the heating-up zone is about 850° C. to about 1060° C.

7. A process according to claim 1, wherein the improvement further comprises the length of the heating-up zone being between about 30% and about 50% of the rotary kiln length.

8. A process according to claim 1, wherein the improvement further comprises maintaining the temperature in the reducing zone at between about 900° C. and about 1060° C.

9. A process according to claim 1, wherein the improvement further comprises maintaining the temperature in the reducing zone at between about 930° C. and about 1040° C.

10. A process according to claim 1, wherein the improvement further comprises the length of the reducing zone being between about 50% and about 70% of the rotary kiln length.

* * * * *